Sept. 30, 1952 J. J. BABB ET AL Re. 23,552
APPARATUS FOR MARINE SEISMIC PROSPECTING
Original Filed Aug. 29, 1947
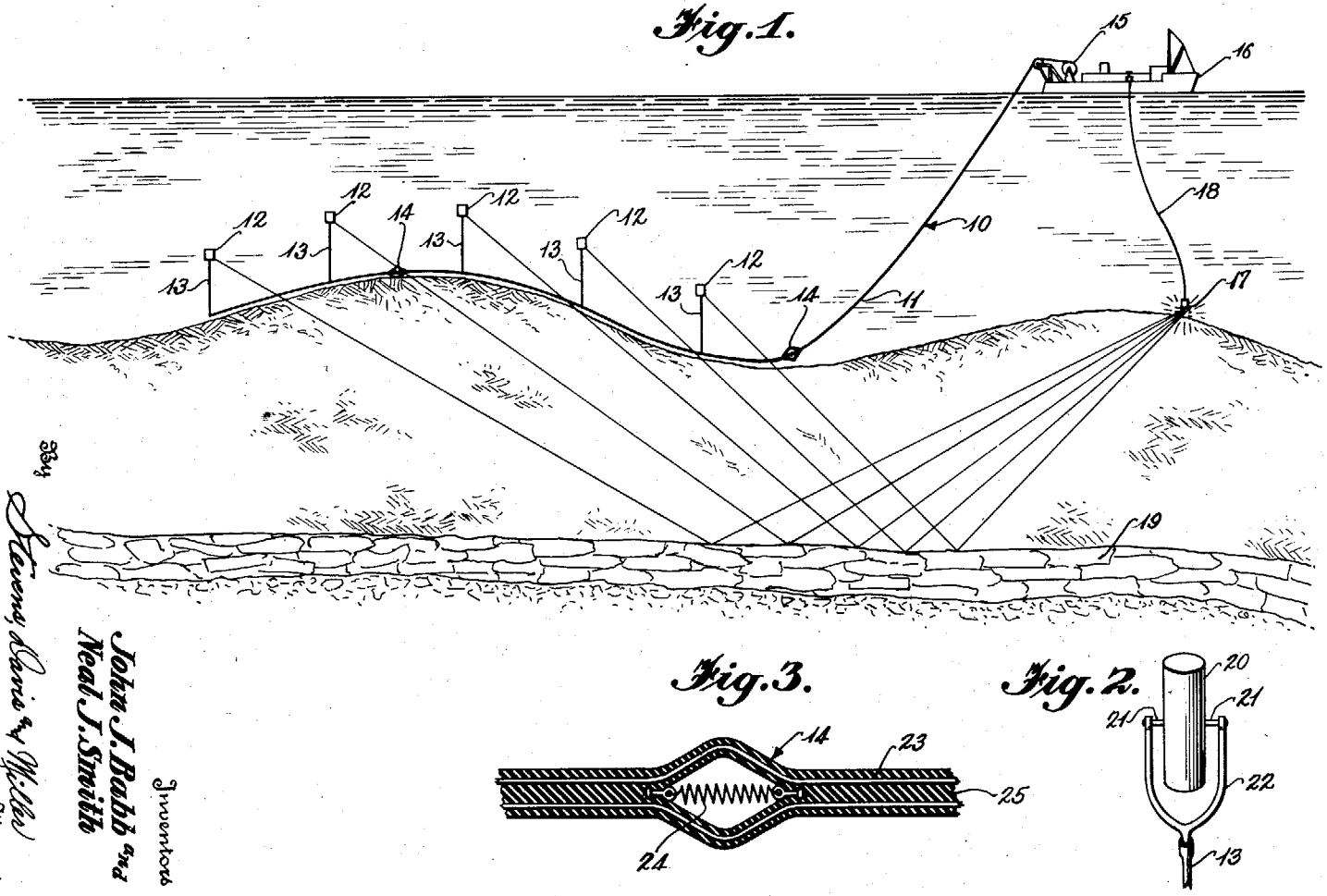
Inventors
John J. Babb and
Neal J. Smith
By Stevens, Davis and Miller
Attorneys Reissued Sept. 30, 1952 Re. 23,552

UNITED STATES PATENT OFFICE 23,552

APPARATUS FOR MARINE SEISMIC PROSPECTING

John J. Babb, Calgary, Alberta, Canada, and Neal J. Smith, New Orleans, La.; said Babb assignor to Texas Instruments Incorporated, a corporation of Delaware, and said Smith assignor to The California Company, New Orleans, La., a corporation of California Original No. 2,544,819, dated March 13, 1951, Serial No. 771,344, August 29, 1947. Application for reissue March 12, 1952, Serial No. 276,108

7 Claims. (Cl. 177—352)

Matter enclosed in heavy brackets [ ] appears in the original patent but forms no part of this reissue specification; matter printed in italics indicates the additions made by reissue.

This invention relates to seismic surveying and prospecting and more particularly to novel methods of and apparatus for conducting seismic surveys in areas covered by water.

In conducting seismic surveys in areas covered by water several important problems are encountered that are peculiar to underwater operations. These problems include the maintenance of predetermined relative spacing among the seismometers of the spread, the maintenance of predetermined spacing of the seismometers from the bottom, the maintenance of location with respect to the shot point and the movement of the spread to and from the several locations from which data is to be obtained.

While there has been considerable activity directed to the solution of the foregoing problems, the results have been generally discouraging in that the solution of one of the problems has tended to result in magnification of another. Thus, the overall results obtainable from submarine seismic surveys have been heretofore less satisfactory than like surveys involving areas the surface of which is not covered by water.

One attempt to solve the problem of transporting the spread from location to location involves the use of floats for keeping the seismometers of the spread at or near the surface of the water. This scheme, while facilitating towing, has the disadvantage that the spread must be anchored at both ends to prevent displacements or lateral drift due to water current conditions and does not result in predetermined spacing of the seismometers from the bottom. Other schemes, which involve floating the seismometers during towing and sinking them during the shooting, have been found to be unsatisfactory since the sinking of the seismometers of a spread necessarily results in displacement of the spread components so that the operators cannot be sure of the exact location of the spread or the seismometers thereof at the time the shot is made.

It is therefore an object of this invention to solve all of the foregoing problems in such a way as to improve the accuracy of submarine seismic surveys and to facilitate the transportation of the seismometer spread from one location to another.

It is contemplated, according to the present invention, to provide a seismometer spread comprising a cable to which buoyant seismometers are attached by flexible taps so that the assembly may be towed along the bottom with the cable following the contours of the bottom. When the desired location is reached the buoyant seismometers assume automatically predetermined positions relative to the bottom and to each other.

Other objects and advantages of this invention will be apparent upon consideration of the following description thereof in conjunction with the annexed drawings wherein:

Figure 1 is a general view of the apparatus of the present invention showing a typical disposition of the spread on location;

Figure 2 is a schematic view of a seismometer assembly and a pivotal mounting arrangement therefor; and Figure 3 is a sectional view of a portion of the cable of the seismometer spread of Figure 1.

In Figure 1 the numeral 10 is employed to designate generally the seismometer spread. This spread is comprised of a flexible cable 11, a plurality of seismometers 12 and a plurality of flexible taps 13, each connecting one of the seismometers to the cable 11. The cable itself is subdivided into several components or sections by strain relievers 14, the details of which are shown in Figure 2 of the drawings.

Electrical connections from each of seismometers 12 pass through the taps 13 and into and through the cable 11, one end of which is connected to a winch 15 or other paying out and retracting device which is mounted on a ship or boat 16. Also connected to the ship or boat are a plurality of lines leading to submarine explosive charges which are discharged to set in motion the sound waves detected by the seismometers 12. One such charge is shown at 17 in Figure 1 of the drawing, lines 18 leading therefrom to the ship 16 so that the detonation of the charge may be controlled by ship borne personnel. It is, of course, not necessary that the charge be fired from the boat on which the recording is done and, in that case, the charge is fired from a separate boat on verbal orders from an observer and the time break is recorded after it has been transmitted to the recording boat by radio.

On board the ship 16 there is mounted suitable apparatus for recording the output of the several seismometers. Since this apparatus is well known to the art and forms no part of the present invention, detailed description thereof is not deemed to be necessary.

Upon reference to Figure 1 it will be noted that the spread 10, as a whole, is in contact with the bottom or floor of the body of water under which determinations are to be made. It will also be noted that the cable 11 follows the contour of the bottom despite the existence of possible irregularities therein. This result flows from the fact that the spread as a whole has an apparent specific gravity greater than 1, the cable being suitably weighted so as to keep it in contact with the bottom at all times, except, of course, for the leading portion of the cable between the right-hand strain reliever of Figure 1 and the ship. The seismometers, on the other hand, are rendered buoyant by any convenient means such as a sealed gas chamber, floats or the like so that their apparent specific gravity is less than 1. This being the case, the buoyant seismometers pull the flexible taps 13 up from the cable and the seismometers lie in fixed, spaced relation above the cable, and, hence, above the bottom of the body of water. The spacing between the seismometers is, of course, predetermined by the point of attachment to the cable and the spacing above the bottom is predetermined by the length of the tap between the cable and the seismometer. Thus, if all of the taps between the respective seismometers and the cable are of equal length, all of the seismometers will be an equal distance above the bottom of the body of the water so that inaccuracies heretofore encountered in operations of this kind are wholly avoided.

Naturally the water currents tend to affect the position of the seismometers and, should operations be conducted on locations where currents are very strong, the individual seismometers may be mounted to pivot at the end of the taps so as to maintain a substantially vertical position despite some inclination of the taps relative to the vertical. This arrangement is shown in Figure 2 wherein the numeral 20 represents a sealed cylinder containing a seismometer in the bottom and buoyant material in the top. The numerals 21 represent studs located on the center of [gravity of] *pressure or force of water currents on* the cylinder 20, which *studs* coact with a bridle 22 to further furnish a lead into the seismometer from the respective tap 13.

Figure 1 illustrates the seismometer spread on location and indicates the detonation of the charge at 17 and the reflection of the sound waves from a substrata 19 to the several seismometers 12. It is understood, of course, that several charges may be detonated at various points including various depths of water with respect to the seismometer spread at any given location. After determinations have been made at one location, the spread is moved to another location, and here again an advantage of the present invention becomes apparent. Due to the apparent specific gravity of the spread and the buoyancy of the seismometers, the spread may be towed from location to location along the bottom of the body of water, thereby avoiding the necessity for raising the spread during towing operations and inaccuracies which result from sinking the spread on location. To tow, the lines 18, if they are used, are reeled in and the ship is moved to the new location dragging the spread along the bottom from its stern. Naturally, during movement through the water the seismometers will tend to assume an acute angle with respect to the cable due to the resistance offered by the water, but the buoyancy of the seismometers is such that they will maintain a position spaced somewhat above the cable. When the new location is reached, the ship is stopped. As soon as the forward motion has ceased the seismometers attached to the flexible taps will assume a vertical position, as shown in Figure 1. Thereafter further determinations may be made as heretofore described.

During the towing of the cable from location to location it has been found that the use of one or more strain relievers along the length of the cable is helpful. In Figure 3 one of these strain relievers is shown in detail. In effect, the electrical conductors 23 passing through the cable are divided into two or more paths and a resilient member such as a spring 24 is disposed centrally among the cable divisions. The length of the cable subdivisions is considerably greater than the over-all length of the spring in its retracted or normal position so that in the event of engaging a sea bottom obstacle, considerable resiliency lengthwise of the cable is afforded without placing the cable itself under conditions of excessive tension. Thus, upon encountering an obstacle, the spring 24 can be stretched and the cable components around the spring can straighten out to a considerable degree before they themselves are under any material tension. Naturally, instead of a spring as shown at 24, any other resilient means may be used. It is contemplated that the cable may consist of a central flexible core such as is shown at 25 around which the various lead wires and conductors from the several seismometers are wound. The entire cable assembly will, of course, be suitably insulated, weighted and protected from the influences of water.

In the appended claims reference to the specific gravity of water will be understood to mean the specific gravity of the water in which the spread is operated, and not necessarily the specific gravity of pure fresh water. This is apparent when it is borne in mind that prospecting in both salt and fresh water can be effected according to the present invention.

While this invention has been described with reference to but a single embodiment thereof, it is apparent that various changes and modifications may be made within the scope of the invention as defined by the appended claims.

What is claimed is:

1. A seismometer spread for submarine prospecting that comprises a plurality of seismometer units each including a seismometer for converting seismic signals into electrical signals and flotation means which taken with the seismometer will make the seismometer unit have an apparent specific gravity less than that of water in which it is to be used, a flexible electro-conductive cable attached to each seismometer unit for carrying the electrical signals from the seismometer in the unit and positioning the seismometer unit, and a main electro-conductive cable to which the first-mentioned cables are connected at spaced positions, said main seismometer cable serving to conduct the signals from the seismometers to the surface of the water, *the apparent specific gravity of said main cable* being sufficiently *greater* than *that of* the water *to overbalance the combined buoyant effects of the seismometer units so that said main cable* will sink to the bottom of the water and drag the seismometer units down to *submerged* positions above it, which positions will be determined by the lengths of the first-mentioned seismometer cables.

2. A seismometer spread as defined in claim 1 further characterized in that each seismometer is pivotally mounted in the seismometer unit and so balanced as to cause it to maintain a substantially upright position.

3. A seismometer spread as defined in claim 1 further characterized in that the main cable is provided at at least one point along its length with a resilient take-up to prevent a straining of electrical connections in the spread.

*4. A seismographic spread for underwater prospecting comprising a cable having a plurality of flexible lines connected at one end to spaced points along a portion of said cable, a seismometer connected to the free end of each of said lines, the apparent specific gravity of said seismometers being sufficiently less than that of the water to cause said seismometers to tend to lie the length of their associated flexible lines above said cable when said cable is submerged in the water, the apparent specific gravity of said portion of said cable being sufficiently greater than that of the water to overbalance the combined buoyant effects of all of said seismometers to cause said portion of said cable to lie on the bottom with its effective weight distributed linearly along its length whereby said spread may be towed in the direction of the length of said cable with low frictional resistance to towing and with high resistance to lateral drift.*

*5. A seismometer spread for submarine prospecting that comprises a plurality of seismometer units each including a seismometer for converting seismic signals into electrical signals and flotation means which taken with the seismometer will make the seismometer unit have an apparent specific gravity less than that of water in which it is to be used, a flexible line attached to each seismometer unit for positioning the seismometer units, and a main electro-conductive cable to which said lines are connected at spaced positions, said seismometers being electrically connected to said main cable and said main cable serving to conduct the signals from the seismometers to the surface of the water, the apparent specific gravity of said main cable being sufficiently greater than that of the water to overbalance the combined buoyant effects of all of said seismometers so that said main cable will sink to the bottom of the water and drag the seismometer units down to predetermined positions above it, which positions will be determined by the lengths of said flexible lines.*

*6. A method of underwater prospecting intermittently at spaced locations comprising paying out into the water a cable having an apparent specific gravity substantially greater than that of the water and having a plurality of buoyant seismometers flexibly secured in spaced relationship thereto and at spaced intervals along a portion of the length of the cable, continuing such paying out until said portion of said cable sinks to the bottom in water of a depth greater than the spacing of said buoyant seismometers from said cable and said buoyant seismometers lie above said cable and above said bottom but below the surface of the water, continuously maintaining said portion of the cable in substantial engagement with the bottom and with the effective weight of said portion of the cable distributed longitudinally thereof along the bottom while towing said cable in the direction of its length with said portion of said cable sliding longitudinally on the bottom and with said submerged buoyant seismometers trailing in upwardly spaced relationship to said cable and to said bottom, interrupting such towing movement at a location, generating a seismic wave adjacent said location, recording the output of said seismometers, and then towing in the above manner to a new location.*

*7. A method of underwater prospecting comprising paying out into the water a cable having a plurality of buoyant seismometers flexibly secured in spaced relationship thereto and at spaced intervals along a portion of the length of the cable, the apparent specific gravity of said cable being sufficiently greater than that of the water to overbalance the combined buoyant effects of said seismometers continuing such paying out until said portion of said cable sinks to the bottom in water of a depth greater than the spacing of said buoyant seismometers from said cable and said buoyant seismometers lie above said cable and above said bottom but below the surface of the water, towing said cable in the direction of its length to a location while continuously maintaining said portion of the cable in substantial sliding engagement with the bottom and with the effective weight of said portion of the cable distributed longitudinally thereof along the bottom in the direction of towing and with said submerged buoyant seismometers trailing in upwardly spaced relationship to said cable and to said bottom, interrupting such towing movement, generating a seismic wave adjacent said location, and then towing in the above manner to a new location.*

JOHN J. BABB.
NEAL J. SMITH.

REFERENCES CITED

The following references are of record in the file of this patent or the original patent:

UNITED STATES PATENTS

| Number | Name | Date |
|---|---|---|
| 2,203,894 | Cooke | June 11, 1940 |
| 2,241,428 | Silverman | May 13, 1941 |
| 2,283,200 | Flude | May 19, 1942 |
| 2,324 378 | Flude | July 13, 1943 |
| 2,407,697 | Williams | Sept. 17, 1946 |
| 2,423,591 | Flude | July 8, 1947 |
| 2,426,657 | Williams | Sept. 2, 1947 |
| 2,434,793 | Feaster | Jan. 20, 1948 |
| 2,441,236 | Dansard | May 11, 1948 |
| 2,449,085 | Peterson | Sept. 14, 1948 |
| 2,465,696 | Paslay | Mar. 29, 1949 |